United States Patent [19]

Ricci

[11] Patent Number: 4,944,205
[45] Date of Patent: Jul. 31, 1990

[54] RATCHET FEED DRIVE FOR CLAMSHELL LATHE

[76] Inventor: Donato L. Ricci, Rte. 1, Box 1067, Hager City, Wis. 54014

[21] Appl. No.: 471,775

[22] Filed: Jan. 29, 1990

[51] Int. Cl.⁵ ............................................. B23B 3/22
[52] U.S. Cl. ...................................... 82/113; 82/70.2; 82/137
[58] Field of Search .................. 82/113, 117, 128, 130, 82/131, 137, 140, 70.1, 70.2, 154

[56] References Cited

U.S. PATENT DOCUMENTS

| | | | |
|---|---|---|---|
| 4,397,202 | 8/1983 | Mayfield | 82/113 |
| 4,418,591 | 12/1983 | Astle | 82/113 |
| 4,493,232 | 1/1985 | Nall | 82/113 |
| 4,624,052 | 11/1986 | Garcia | 82/113 |
| 4,677,884 | 7/1987 | Kwech et al. | 82/113 |
| 4,739,685 | 4/1988 | Ricci | 82/113 |
| 4,770,074 | 9/1988 | Kwech | 82/113 |
| 4,776,248 | 10/1988 | Berkestrand | 82/113 |
| 4,791,842 | 12/1988 | Olson | 82/113 |
| 4,813,314 | 3/1989 | Kwech | 82/113 |
| 4,823,655 | 4/1989 | Vanderpol | 82/113 |
| 4,854,200 | 8/1989 | Mynhier | 82/113 |

*Primary Examiner*—Frederick R. Schmidt
*Assistant Examiner*—Blynn Shideler
*Attorney, Agent, or Firm*—Haugen and Nikolai

[57] ABSTRACT

The present invention pertains to a cam-actuated ratchet feed drive for a clamshell lathe having a guide block attachable to the rotating ring gear of the clamshell and which slidingly supports a tool holding block in a dove-tail guideway. A threaded lead screw is coupled to the tool holding block and adapted to be driven either clockwise or counterclockwise by a cam-actuated pawl/racket combination. Means are provided for shifting a pair of pawls relative to associated ratchet wheels such that one, the other or neither of the ratchet wheels is driven upon engagement of the cam surface with a stationary cam follower.

6 Claims, 6 Drawing Sheets

RATCHET FEED DRIVE FOR CLAMSHELL LATHE

BACKGROUND OF THE INVENTION

I. Field of the Invention

This invention relates generally to a portable lathe for preparing the ends of tubular or solid cylindrical workpieces of circular cross-section, and more particularly to a tool advancing mechanism for cutting or otherwise machining the workpiece as the tool is made to rotate about the workpiece.

II. Discussion of the Prior Art

The general arrangement of portable lathes for machining either the interior or exterior surfaces of a tube or pipe are known in the art. For example, my earlier U.S. Pat. No. 4,739,685 describes a split frame portable machining lathe having a clamshell structure adapted to be clamped about the tubular workpiece and which includes a rotatable member in the form of a ring gear journaled for rotation relative to an adjacent stationary member which is clamped to the workpiece in question. The ring gear is arranged to be driven by a suitable motor at a predetermined speed and affixed to it is a tool holder which can be made to move in a radial direction by means of a conventional star wheel drive. In such a star wheel drive, each time the tool holder rotates past a fixed trip pin mounted on the stationary portion of the clamshell, the star wheel is rotated one tooth pitch and, in doing so, rotates a threaded rod or lead screw to which a tool holding block is affixed. Thus, upon each revolution, the tool holding block moves radially an incremental amount determined by both the tooth pitch of the star wheel and the pitch of the threaded rod driven by the star wheel.

While the above-described star wheel configuration provides a workable way of incrementally advancing a cutting tool relative to a tubular workpiece, it suffers from a number of defects, not the least of which is frequent breakage or wear of the trip pin. When it is considered that portable pipe end finishing lathes are frequently used in effecting repairs in piping used in power plants, including nuclear power plants, it is important that the device work properly over prolonged periods of time to avoid unnecessary exposure of human maintenance personnel in areas where they may be exposed to harmful radiation.

Not only is the star wheel system for advancing the cutting tool subject to breakage, but also it permits only one tool feeding rate. That is to say, once the tooth pitch and thread pitch of the star wheel assembly are set, the tool feed rate can no longer be readily varied to suit a particular application.

OBJECTS

It is accordingly a principal object of the present invention to provide an improved tool feed mechanism for use with a clamshell lathe assembly.

Another object of the invention is to provide a tool feed mechanism for a clamshell lathe which is less subject to breakage and attendant need for repair.

Still a further object of the invention is to provide a tool feed mechanism for a clamshell type lathe which allows adjustment of the feed rate to be easily made.

SUMMARY OF THE INVENTION

The foregoing features, objects and advantages of the invention are achieved by providing a steel guide block which is attachable to the ring gear of a clamshell-type lathe and which includes a longitudinal guideway having a dove-tail cross-section for receiving a slidable tool block therein. A threaded lead screw extends parallel to the guideway and includes a threaded nut thereon which engages the tool holding block so that when the lead screw is rotated, the tool holding block will be translated in a radial direction either toward or away from the workpiece, depending on the direction of rotation of the lead screw.

To drive the lead screw, a housing is attached to the guide block and journaled for rotation within that housing is a shaft on which is keyed first and second oppositely-oriented ratchet wheels and a drive gear. The drive gear engages a driven gear keyed to the aforementioned lead screw. The housing includes a pocket for receiving a ratchet feed slide assembly. The ratchet feed slide assembly includes a cam surface on an exposed end edge thereof and a pair of spring-loaded pawls for selectively engaging one, the other or neither of the two ratchet wheels, depending upon the setting of a manually operated shift lever.

Mounted on the stationary portion of the clamshell is a cam actuator in the form of a bracket which supports a plunger having a cam follower or roller on one end thereof adapted to engage the cam surface on the ratchet feed slide. The degree or amount of extension of the plunger rod relative to its support bracket can be manually adjusted by simply rotating a threaded rod supported in the bracket. Depending upon the setting of the manually operable shift lever, the lead screw associated with the tool holding block can be rotated either clockwise or counterclockwise, with the extent of rotation being governed by the plunger extension setting.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
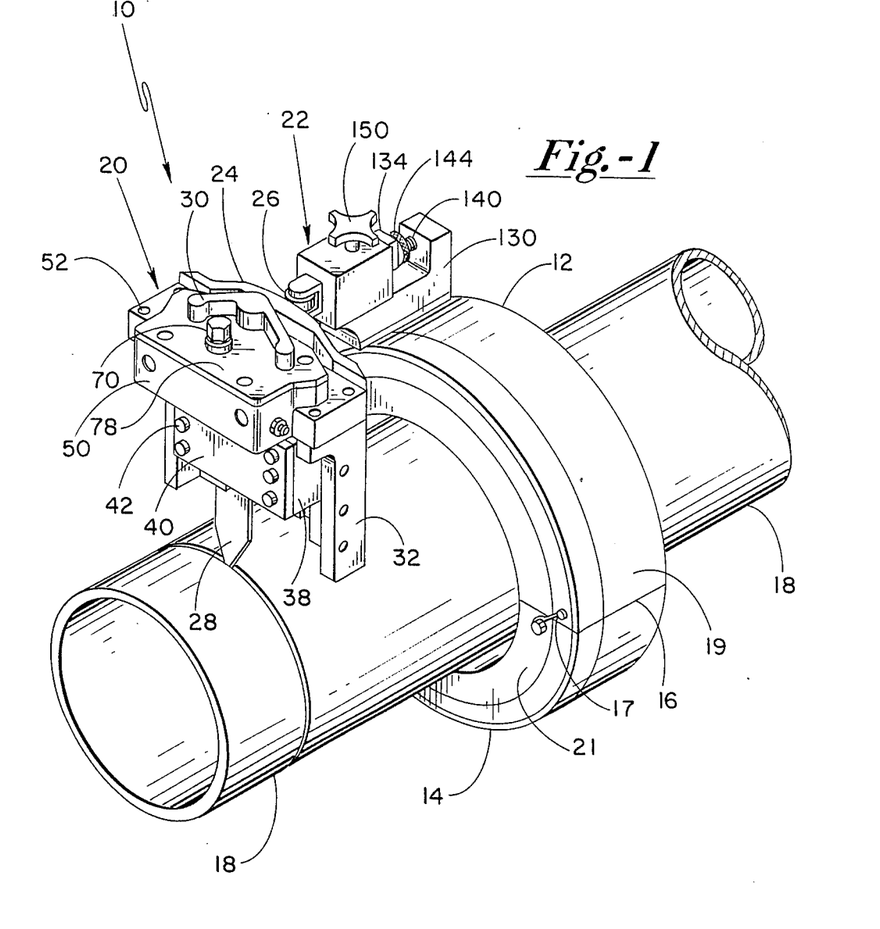
FIG. 1 is a perspective view of the ratchet tool feed drive mounted on a clamshell for performing turning operations on a cylindrical pipe or shaft.

Referring first to FIG. 1, there is indicated generally by numeral 10 a clamshell lathe incorporating the ratchet tool feed drive of the present invention The clamshell lathe is seen to comprise two generally semi-circular segments 12 and 14 which, when joined together along a parting line 16 by clamps at 17 creates a toroidal collar surrounding the exterior of a cylindrical workpiece, here shown as a pipe 18.

Figure 8:
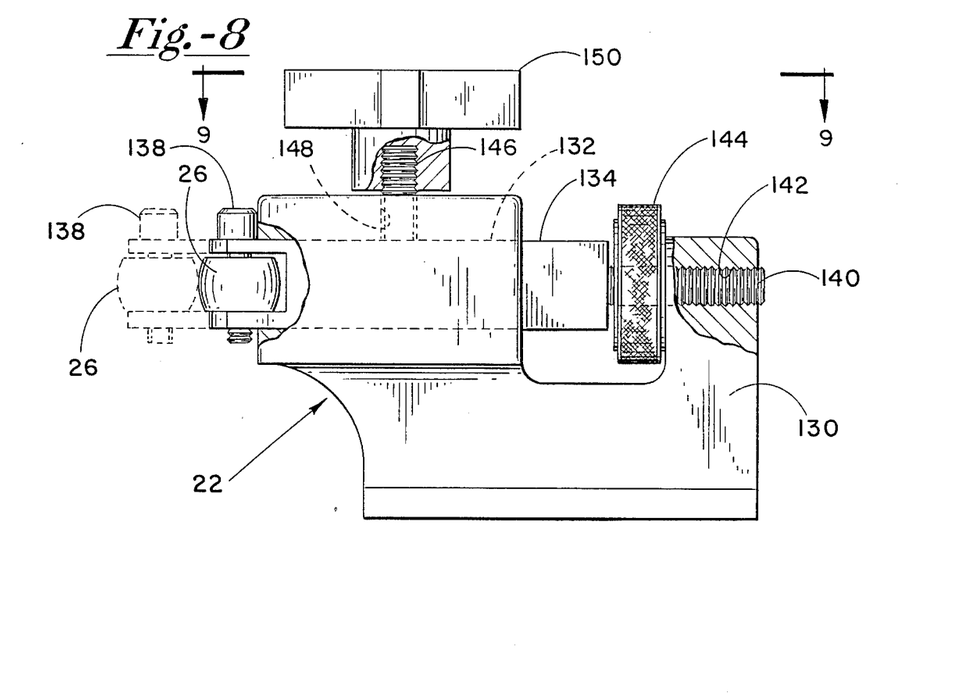
FIG. 8 is a side view of the manually settable feed bracket assembly.
Figure 9:
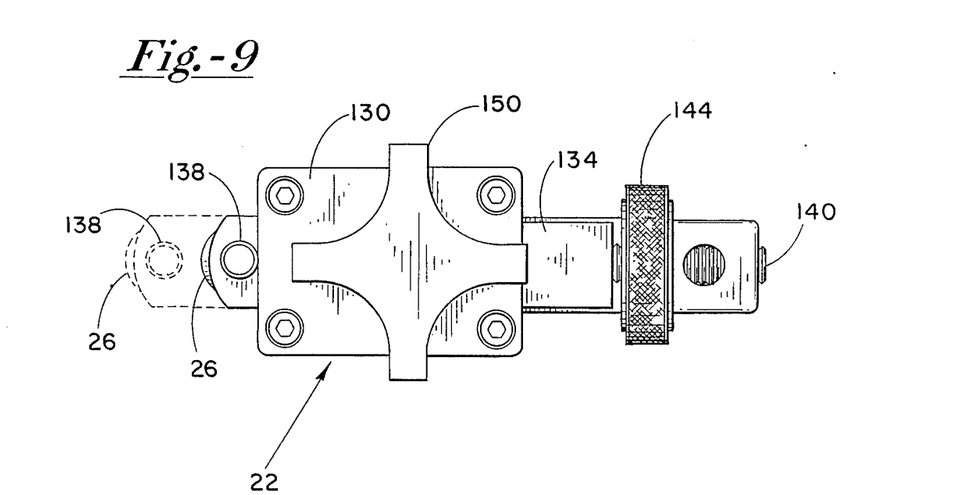
FIG. 9 is a top view of the manually operated feed bracket assembly of FIG. 8.

As is set forth in my aforereferenced U.S. Pat. No. 4,739,685, the clamshell 12 includes a stationary member 19 and a movable member 21 which is adapted to be driven by either a hydraulic or air motor which is not shown in FIG. 1 hereof so as to avoid confusion in the drawings. Those desiring more detailed information concerning the construction and mode of operation of the clamshell structure 12 may refer to my U.S. Pat. No. 4,739,685. Suffice it to say, that the ratchet tool feed drive assembly indicated generally by numeral 20 attaches to the movable member 21 while the manually adjustable cam actuator 22 attaches to the stationary member 19. As such, upon each revolution of the ratchet tool feed drive 20 about the pipe 18, the cam surface 24 of the ratchet tool feed drive will engage a roller 26 mounted on the end of a plunger rod, all as will be more particularly described when the views of FIGS. 8 and 9 are discussed. The actuation of the device 20 on successive rotational cycles functions to move a cutting tool 28 either inward or outward relative to the workpiece 18 depending upon the particular setting of a shift lever 30.

Figure 2:
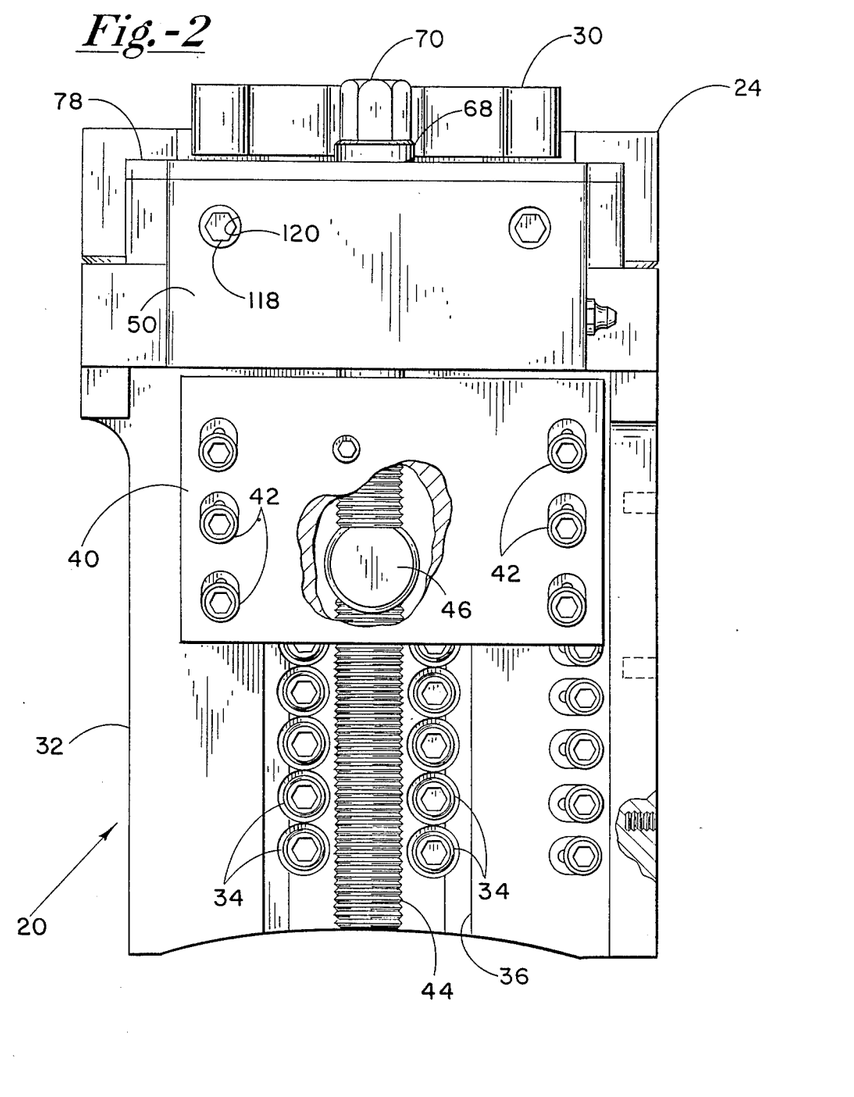
FIG. 2 is a front view of the ratchet tool feed drive of the present invention.
Figure 3:
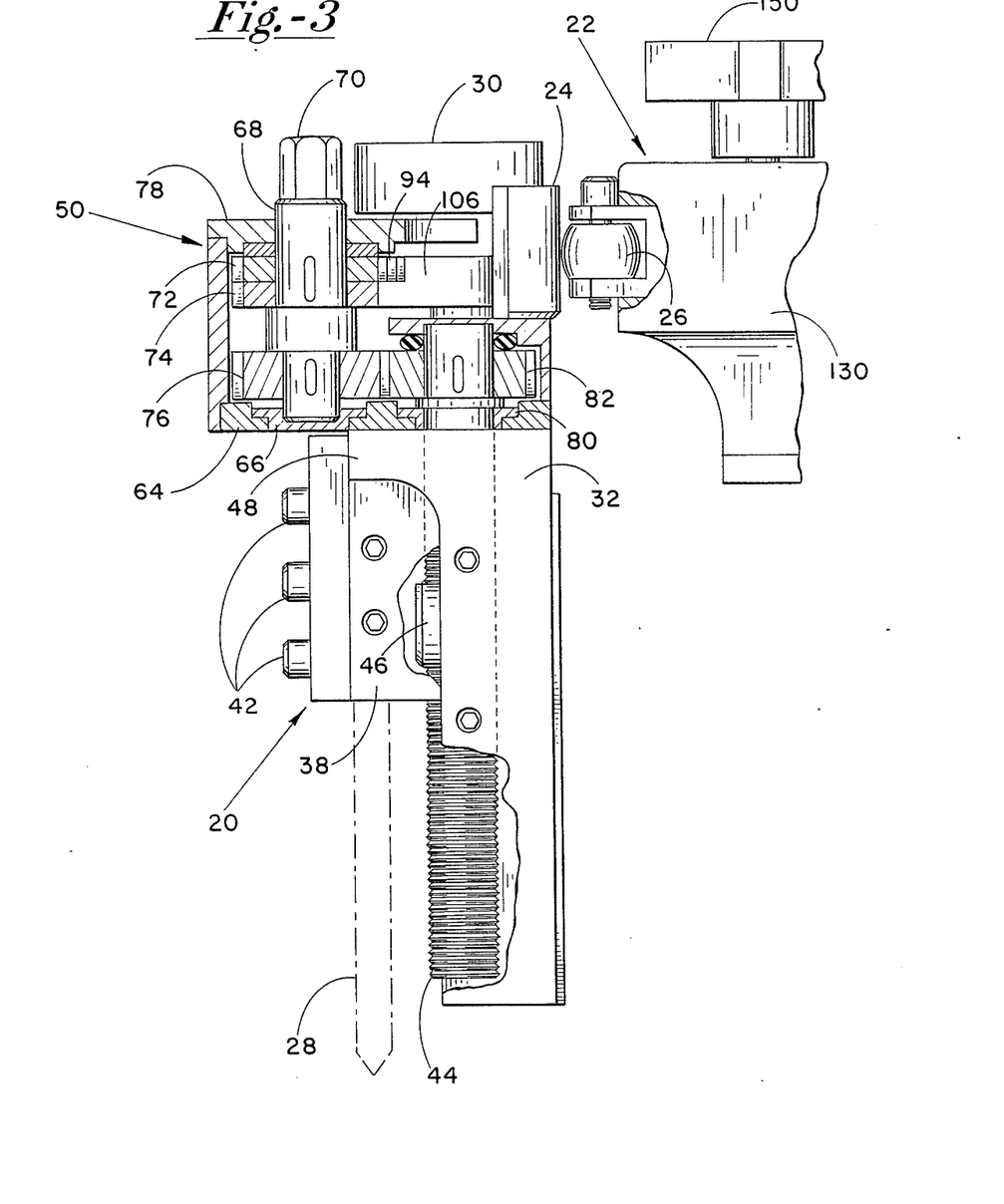
FIG. 3 is a partially cross-sectioned side elevation of the ratchet tool feed drive.

Next, with reference to FIGS. 2 and 3, the ratchet tool feed drive assembly 20 is seen to comprise a guide block means 32 preferably made from cold rolled steel and which is arranged to be attached to the gear ring which is the movable member portion 21 of the clamshell 12. The attachment is by way of bolts passing through appropriate holes 34 drilled through the guide block 32. By providing a series of holes 34, flexibility is provided in the distance between the working end of the cutting tool 28 (FIG. 1) and the workpiece 18 during mounting, all as will become more apparent as the discussion proceeds.

Also, formed in the steel guide block 32 is a dove-tail guideway 36 which is oriented radially relative to the workpiece when the guide block 32 is attached to the ring gear of the clamshell. Fitted into the dove-tail guideway 36 in the guide block 32 is a tool holding means 38 (FIG. 3) which takes the form of a block having integrally formed dove-tails for cooperating with the dove-tail groove or guideway in the guide block 32. The block 38 also includes a channel into which the cutting tool 28 fits. The cutting tool itself is shown in phantom line form in FIG. 3 projecting downwardly from the tool holding block 38. A plate 40 when tightened down against the block 38 by the Allen-head cap screws 42 firmly clamps the tool 28 in place.

The tool holding block 38 fits in the guideway block 32 so as to allow reciprocal sliding movement between the two pieces. The tool holding block 38 also includes a bore extending parallel to the guideway when the tool holding block is disposed within its guideway. Passing through the bore in non-contact relation is a lead screw 44 which has a threaded nut 46 disposed thereon. The nut 46 fits into a recess formed in the tool holding block 38 whereby rotation of the lead screw 44 imparts motion to the tool holding block 38 in the guideway of the guide block 32.

Referring to FIG. 3, it can be seen that the guide block 32 includes an integrally formed flange portion 48 on its upper end and bolted to that flange portion is a housing 50, the bolts being identified by numerals 52. As can best be seen from the plan view of FIG. 7, the housing 50 includes a planar base or floor 54 and three integrally formed wall surfaces 56, 58 and 60 defining a U-shaped slot or pocket. A large circular bore 62 is drilled through the wall 58 and the floor 54 and abutting the underside of the housing 50 is a sleeve-bearing mounting plate 64 into which is fitted an Oilite sleeve bearing 66.

Figure 4:
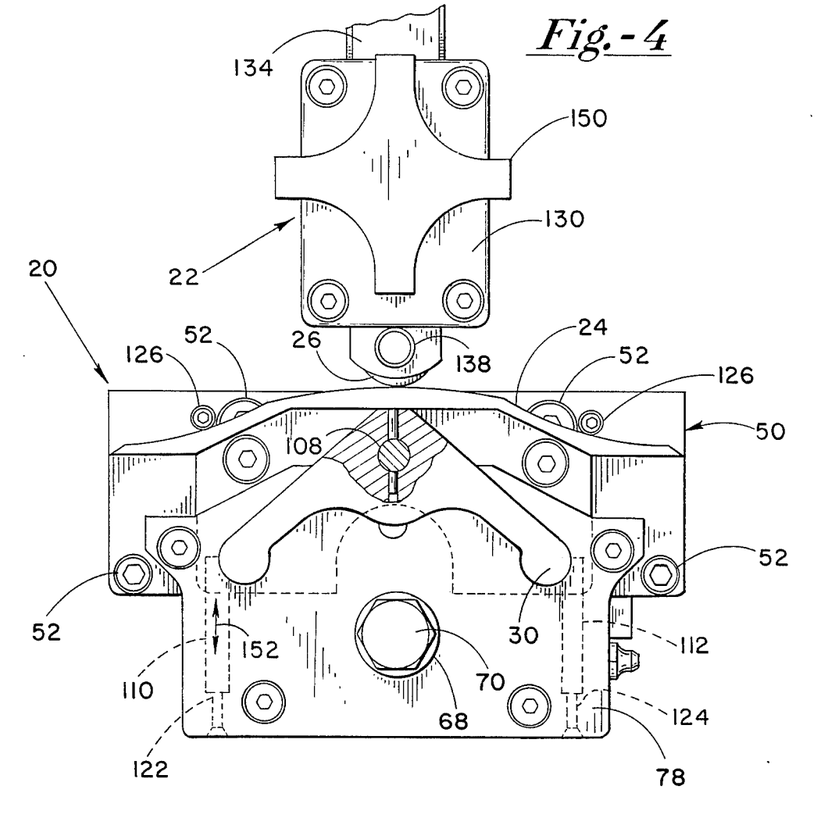
FIG. 4 is a top view of the ratchet tool feed drive and associated stroke-adjusting actuator.
Figure 5:
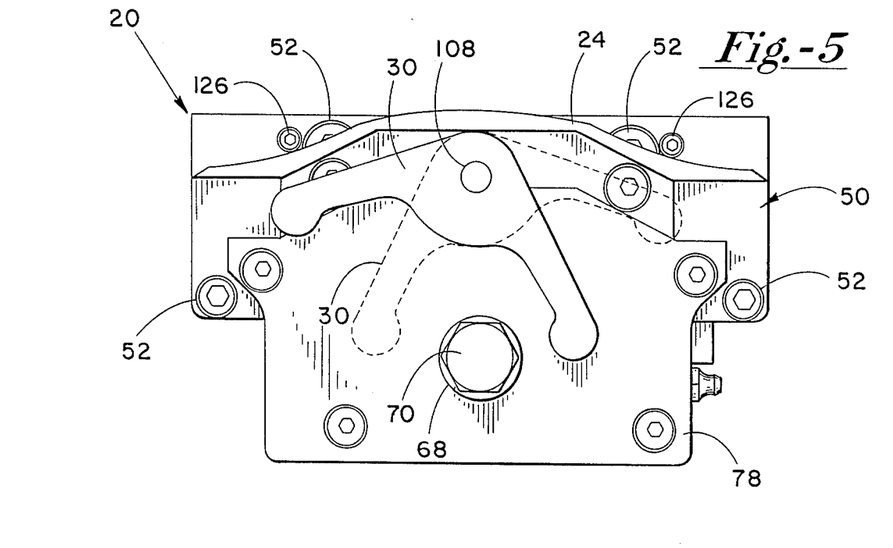
FIG. 5 is a further top view of the ratchet tool feed drive showing the shift lever in its alternate positions.
Figure 6:
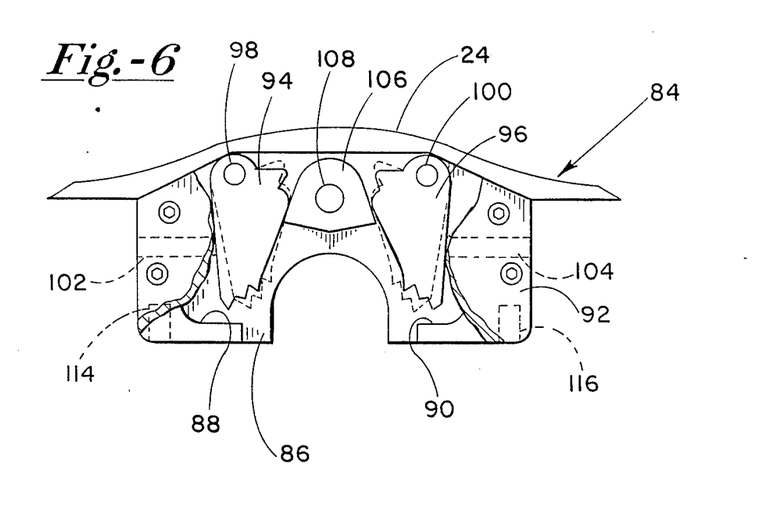
FIG. 6 is a broken-away view showing the cam actuated ratchet gear assembly used in the ratchet tool feed drive.

Referring again to FIG. 3, journaled for rotation within the sleeve bearing 66 is a drive shaft 68 having a generally cylindrical body and an integrally formed hex head 70. Keyed to the drive shaft 68 are a pair of oppositely directed ratchet wheels 72 and 74 and a drive gear 76. A cover plate 78, when bolted in place, as shown in FIG. 5, rests atop the walls 56, 58 and 60 to define a pocket for receiving a cam actuated ratchet gear means, the construction of which is best illustrated in FIGS. 4 through 6. At this point it should also be mentioned that the bearing plate 64 in FIG. 3 also contains a second sleeve bearing 80 in which is journaled the lead screw 44 and keyed to the upper end of the lead screw at a location within the pocket of the housing member 50 a driven gear 82 which is arranged to mesh with the drive gear 76.

As mentioned above, the cam actuated ratchet gear means best illustrated in FIG. 6 is dimensioned to fit within the pocket formed within the housing 50 secured to the guide block 32 and includes the cam surface 24. The cam actuated ratchet gear means is indicated generally by numeral 84 in FIG. 6 and includes a base plate 86 having perpendicularly projecting walls 88 and 90. Attached to the exposed edges of the walls 88 and 90 is a cover plate 92. Contained within the pocket defined by these walls and the cover of the device 84 are a pair of spring biased pawls 94 and 96 which are pivoted for rotation about dowel pins 98 and 100. The pawls are urged toward the center by a pair of compression springs 102 and 104.

Positioned between the pawls 94 and 96 is a cam element 106 which is keyed to a shaft 108 to which the shift lever 30 is affixed. When the shift lever 30 is moved to the position shown in solid line form in FIG. 5, the cam 106 will be rotated to cause the pawl 94 to be retracted against the force of the spring 102 while the pawl 96 is extended Likewise, when the shift lever 30 is moved to the dotted line position shown in FIG. 5, the cam 106 will force the pawl 96 away from center and against the force of the spring 104 while the pawl 94 is allowed to move toward center under the force provided by the spring 102. When the switch lever 30 is centered, the cam 106 will cause both pawls 94 and 96 to be retracted to the side and away from center.

FIG. 3 best illustrates the manner in which the pawls 94 and 96 cooperate with the ratchet wheels 72 and 74. That is to say, pawl 94 is dimensioned to cooperate with the ratchet wheel 72 while pawl 96 is arranged to cooperate with the ratchet wheel 74 upon appropriate positioning of the shift lever 30.

Figure 7:
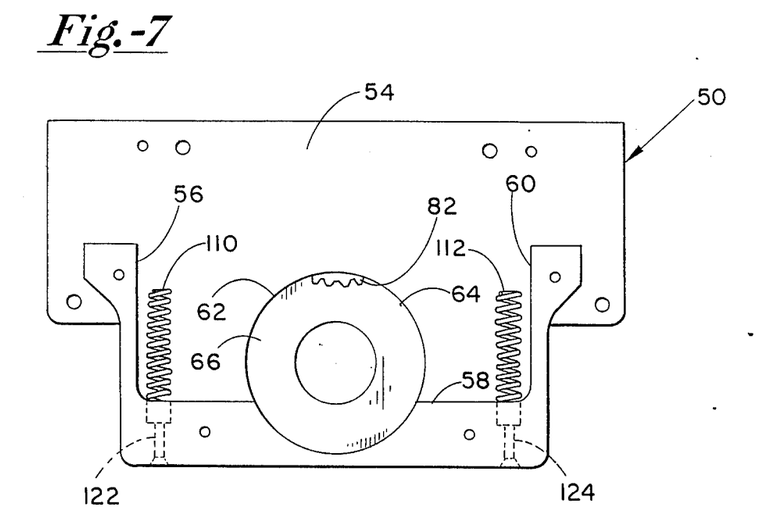
FIG. 7 is a top view of the ratchet feed slide housing with its cover plate removed.

As shown in FIG. 7, first and second compression springs 110 and 112 fit into bores formed in the wall 58 with a portion thereof extending outward of the bores and arranged to fit within corresponding bores 114 and 116 drilled in the exterior edge surface defining the walls 88 and 90 of the cam actuated ratchet gear means or feed slide means 84 The amount of extension of the springs and, therefore, the force required to compress same may be adjusted by screws 118 and 120 (FIG. 2) fitted into threaded counterbores 122 and 124 (FIG. 7). It should be apparent to those skilled in the art that the springs 110 and 112, cooperating between the housing member 50 and the feed slide mechanism 84 of FIG. 6 normally urges the feed slide mechanism 84 in a direction outward of the pocket in which it has a sliding fit. The extent of outward motion of the feed slide mechanism 84 relative to the housing 50 is established by dowel pins 126 which fit into bores formed in the housing but extending outward therefrom so as to cooperate with a portion of the cam surface 24.

Depicted in FIGS. 8 and 9 is a means for adjusting the stroke of the feed slide gear mechanism 84 and, therefore, the degree of rotation per stroke of the lead screw 44. The device shown in FIGS. 8 and 9 comprises a bracket 130 which is adapted to be bolted or otherwise affixed to the stationary portion 19 of the clamshell assembly 12. The bracket includes a longitudinal bore 132 for receiving a plunger 134 therein, the plunger being dimensioned so as to be free to slide within the bore 132. Affixed to the end of the plunger 134 is the cam wheel 26 which is journaled for rotation about a shaft (bolt) 138. The degree of extension of the plunger rod 134 beyond the end of the bracket is adjustable. More particularly, it can be seen that the plunger 134 includes a threaded end portion 140 which is screwed into a threaded bore 142 formed in the end of the bracket 130. By rotating the knurled knob 144 attached to the threaded rod 140, the cam wheel 26 can be adjusted between the position shown in solid line form to that shown in a dotted line representation. Once the desired extension has been set, it can be held by means of a set screw 146 passing through a threaded bore 148 and intersecting with the bore 132 containing the plunger rod 134. A knob 150 facilitates the tightening and release of the locking set screw 146 relative to the plunger 134.

Having described the constructional features of the ratchet tool feed drive for the clamshell lathe, consideration will now be given to its mode of operation.

OPERATION

With the guide block 32 fastened to the ring gear 21 of the clamshell 12 and the bracket 130 affixed to the stationary portion 19 of the clamshell, as the ring gear is driven by its motor (not shown), the ratchet tool feed drive assembly 20 will orbit about the workpiece (pipe) 18 and on each revolution, the cam surface 24 of the feed slide assembly 84 will come into contact with the roller 26 and because of the ramp-up and ramp-down profile of the cam surface 24, the feed slide assembly 84 of FIG. 6 will be made to move in a reciprocating fashion within the pocket of the housing 50 and against the force exerted by the compression springs as indicated by the double-headed arrow 152 in FIG. 5. When the shift lever 30 is in the neutral position, neither pawl 94 nor pawl 96 will engage its respective ratchet wheel 72 and 74. As such, the movement of the slide mechanism 84 will not impart any rotational motion to the drive shaft 68.

With the shift lever 30 moved to the position indicated in solid line form in FIG. 5, cam 94 will be retracted while cam 96 is extended. Thus, during the reciprocating stroke of the slide mechanism 84, the ratchet teeth on the pawl 96 will engage the ratchet wheel 74 resulting in a clockwise rotation of the drive shaft 68. The extent of rotation will be governed by the setting of the cam follower wheel 26.

Rotation of the drive shaft 68, in turn, rotates the drive gear 76 and because it meshes with the driven gear 82 on the lead screw 44, the lead screw 44 will be rotated in a counterclockwise direction under the previously assumed shift lever position. When the shift lever is rotated to the position shown in dotted line form in FIG. 5, pawl 96 will now be retracted while pawl 94 is extended. The reciprocating slide motion of the slide assembly within the housing pocket will now result in the ratchet teeth on the pawl 94 engaging the ratchet wheel 72 causing a counterclockwise rotation of the drive shaft 68. A counterclockwise rotation of the drive shaft 68, of course, imparts a clockwise rotation to the lead screw 44.

As the lead screw 44 is rotated in one direction or the other, the nut 46 thereon in engagement with the tool holding block 38 will cause the tool holding block to move up or down within the guideway formed in the guide block 32 and thus advance or retract the cutting tool 28 clamped in the tool block 38 relative to the workpiece 18. Assuming that a cutting operation is to be performed on the exterior surface of the workpiece 18, a clockwise rotation of the lead screw 44 will cause the tool to advance a predetermined minute distance towards the workpiece on each revolution of the ratchet tool feed drive assembly relative to the stationary manually adjustable cam follower mechanism 22.

While not particularly illustrated in the view of FIG. 1, those skilled in the art will appreciate that one may also utilize the ratchet tool feed drive of the present invention to cut or mill the internal surface of the workpiece 18 provided an appropriate tool holding fixture is clamped within the tool block 38, allowing the cutting edge of the tool to move against the internal diameter of the workpiece when the shift lever 30 is positioned so as to create a counterclockwise rotation of the lead screw 44.

With the shift lever 30 in its neutral position cam 106 will be as illustrated in FIG. 6 and the reciprocating movement of the feed slide assembly 84 will produce neither clockwise nor counterclockwise movement of the lead screw 44 in that both pawls 94 and 96 will be shifted out of position to engage their respective ratchet wheels 72 and 74.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A ratchet tool feed drive for a clamshell lathe, said clamshell lathe being of the type comprising a toroidal structure including a stationary member for clamping a cylindrical workpiece therein and a motor driven relatively movable member encircling said workpiece and rotatable about the longitudinal axis of said cylindrical workpiece, said ratchet tool feed drive comprising in combination:
- (a) guide block means attachable to said relatively movable member for rotation therewith, said guide block means including a guideway oriented radially relative to said workpiece when said guide block means is attached to said relatively movable member;
- (b) tool holding means disposed in said guideway of said guide block for reciprocal sliding movement therein, said tool holding means including a bore extending parallel to said guideway when said tool holding means is disposed within said guideway;
- (c) lead screw means having a threaded nut thereon and extending through said bore, said nut being in engagement with said tool holding means whereby rotation of said lead screw means imparts translational motion to said tool holding means in said guideway;
- (d) driven gear means attached to said lead screw;
- (e) cam actuated ratchet gear means selectively operatively coupled to said driven gear means; and
- (f) means attached to said stationary member for engaging said cam actuated ratchet gear means on each revolution of said movable member.

2. The ratchet tool feed drive as in claim 1 wherein said cam actuated ratchet gear means comprises:
- (a) housing means secured to said guide block means, said housing means including means for journaling said lead screw for rotation with said drive gear means disposed within said housing means;
- (b) a drive shaft journaled for rotation in said housing about an axis parallel to said lead screw, said drive shaft supporting a pair of ratchet drive wheels and a drive gear thereon, said drive gear engaging said driven gear; and
- (c) pawl means slidably disposed within said housing means for selectively engaging one, the other or neither of said pair or ratchet drive wheels.

3. The ratchet tool feed drive as in claim 2 wherein said pawl means comprises:
- (a) feed slide means having a cam surface thereon for cooperating with said means attached to said stationary member, said feed slide means fitted within said housing means for reciprocating sliding motion; and
- (b) shifting means for shifting one, the other or neither of said pawl means into engagement with said pair of ratchet drive wheels.

4. The ratchet tool feed drive as in claim 3 wherein said shifting means includes:
- (a) a further cam journaled for limited rotation within said feed slide means;
- (b) manual operated shift lever means cooperating with said further cam, said further cam including means for urging said pawl means into the path of one, the other or neither of said pair of ratchet drive wheel means depending on the setting of said shift lever means.

5. The ratchet tool feed drive as in claim 3 wherein said means attached to said stationary member for engaging said cam actuated ratchet gear means comprises:
- (a) a bracket secured to said stationary member including a bore;
- (b) a rod passing through said bore in said bracket and including a roller journaled for rotation on said rod, said roller adapted to engage said cam surface; and
- (c) means for manually setting the degree of extension of said rod beyond said bracket.

6. The ratchet tool feed drive as in claim 1 wherein said means attached to said stationary member for engaging said cam actuated ratchet gear means comprises:
- (a) means for adjusting the stroke of said cam actuated ratchet gear means.

* * * * *